US007341351B2

(12) United States Patent
Halmi et al.

(10) Patent No.: US 7,341,351 B2
(45) Date of Patent: Mar. 11, 2008

(54) AERIAL ADVERTISING DEVICE FOR THE PRESENTATION OF PICTURES THAT CHANGE OVER TIME

(76) Inventors: Gergö Halmi, Iskola u. 6., Bátonyterenye H-3070 (HU); György Tóthfalusi, Nádor u. 19., Budapest, H-1051 (HU)

(*) Notice: Subject to any disclaimer, the term of this patent is extended or adjusted under 35 U.S.C. 154(b) by 295 days.

(21) Appl. No.: 10/554,019

(22) PCT Filed: Apr. 19, 2004

(86) PCT No.: PCT/HU2004/000039

§ 371 (c)(1),
(2), (4) Date: Oct. 21, 2005

(87) PCT Pub. No.: WO2004/095403

PCT Pub. Date: Nov. 4, 2004

(65) Prior Publication Data

US 2006/0209402 A1 Sep. 21, 2006

(30) Foreign Application Priority Data

Apr. 24, 2003 (HU) ................................ 0300109 U

(51) Int. Cl.
*G03B 21/00* (2006.01)
*G03B 21/26* (2006.01)
*G01F 21/06* (2006.01)

(52) U.S. Cl. .......................... 353/13; 353/94; 353/122; 40/214

(58) Field of Classification Search .................. 353/13, 353/28, 62, 94, 122; 359/451; 40/212, 214
See application file for complete search history.

(56) References Cited

U.S. PATENT DOCUMENTS 2,592,444 A 4/1952 Matelena ..................... 353/13
3,586,432 A 6/1971 Pentes, Jr. ............... 353/94.13

(Continued)

*Primary Examiner*—Christopher Mahoney
(74) *Attorney, Agent, or Firm*—Joseph G. Seeber

(57) ABSTRACT

The subject of the invention relates to an aerial advertising device for the presentation of pictures that change over time which contains an inflatable information-carrying body (90) that has a hollow internal space (92), a supporting structure (50) positioned in the internal space (92) of the information-carrying body (90), an image formation unit (10) connected to the supporting structure (50), as well as a power supply unit linked to the image formation unit (10) and a fixing unit (80) connected to the information-carrying body (90), the information-carrying body (90) has a filling opening (93) in connection with the internal space (92), furthermore, a group of markings (2) consisting of one or more characters and/or graphics is displayed on the information-carrying body (90), and at least a part of the group of markings (2) displayed on the information-carrying body (90) is formed by the virtual picture projected onto the internal surface (95) of the information-carrying body (90) with the assistance of the image formation unit (10). The characteristic feature of the invention is that the image formation unit (10) is formed by an ordered group of at least six projection devices (11, 12, 13, 14, 15, 16) permanently fixed in relation to the information-carrying body (90), the individual projection devices (11, 12, 13, 14, 15, 16) are connected to an image-storage and editing part-unit (30) via a data transfer channel (20), the supporting structure (50) has supporting plates (51, 52, 53, 54, 55, 56) that can be moved independently of each other, at least some of the individual projection devices (11, 12, 13, 14, 15, 16) are fitted to different supporting plates (51, 52, 53, 54, 55, 56), and at least one continuous part of the group of markings (2) is formed by the continuous group of picture elements (2*a*) projected by at least a group of some of the projection devices (11, 12, 13, 14, 15, 16) arranged in this way.

20 Claims, 1 Drawing Sheet

U.S. PATENT DOCUMENTS

Figure 1:
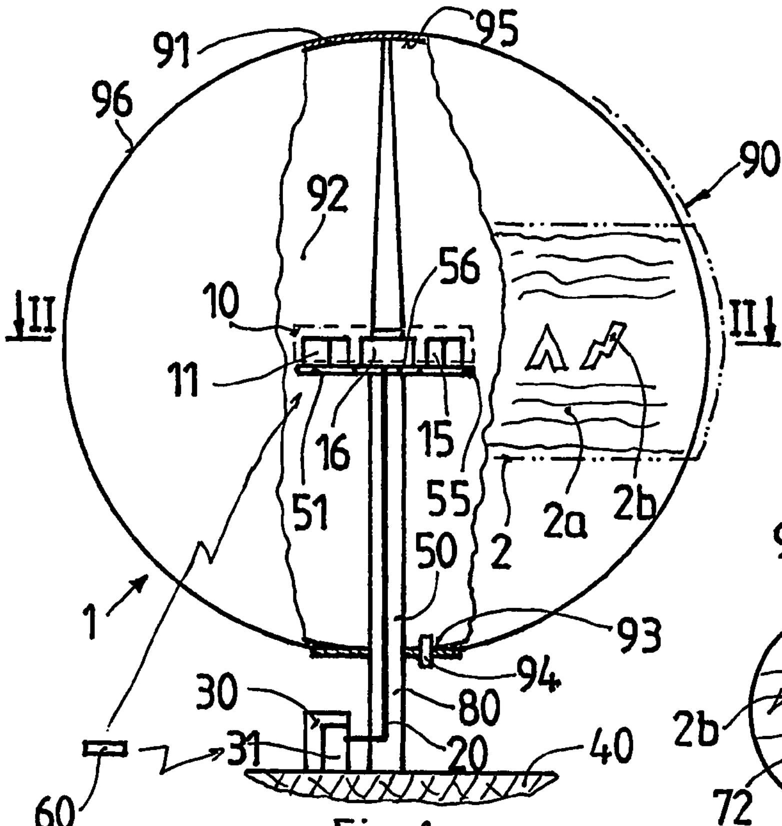

| | | | | |
|---|---|---|---|---|
| 4,597,633 | A | 7/1986 | Fussell | 350/125 |
| 5,612,741 | A | 3/1997 | Loban et al. | 348/383 |
| 6,669,346 | B2 * | 12/2003 | Metcalf | 353/94 |
| 2002/0171927 | A1 | 11/2002 | Barnes, III | 359/451 |
| 2005/0219479 | A1 * | 10/2005 | Mugrauer | 353/122 |

* cited by examiner

AERIAL ADVERTISING DEVICE FOR THE PRESENTATION OF PICTURES THAT CHANGE OVER TIME

The subject of the invention relates to an aerial advertising device for the presentation of pictures that change over time which contains an inflatable information-carrying body that has a hollow internal space, a supporting structure positioned in the internal space of the information-carrying body, an image formation unit connected to the supporting structure, as well as a power supply unit linked to the image formation unit and a fixing unit connected to the information-carrying body, the information-carrying body has a filling opening in connection with the internal space, furthermore, a group of markings consisting of one or more characters and/or graphics is displayed on the information-carrying body, and at least a part of the group of markings displayed on the information-carrying body is formed by the virtual picture projected onto the internal surface of the information-carrying body with the assistance of the image formation unit.

Various advertisements and purchase-promoting publicity have been used for a long time in order to promote the sale of various products and services. A group of these are those advertising devices that rising up into the air carry the attention-grabbing message to the purchasers relating to the goods destined to be sold. Of the known aerial advertising devices there are those in which the upthrust required to raise the structure up into the air is provided by a balloon filled with helium or even hot air, and the pictures and text to be displayed are projected onto the internal surface of the skin of the balloon with the help of a projector. Examples of such a solution are presented patent specifications registration nos. U.S. Pat. No. 4,597,633. and U.S. Pat. No. 2,592,444.

The disadvantage of these constructions is that the movement of the picture projected onto the skin of the balloon involving a change of position, e.g. revolving, can only be solved with a complex mechanical structure, which increases the mass of the advertising device to be kept up in the air, and due to the moving components this increases the probability of a fault occurring. A further disadvantage deriving from this is that the operation costs and servicing requirements of the equipment are high.

It is unfavourable that changing the projected pictures is also difficult to solve simply, what is more, the production of the pictures themselves require special techniques, because due to the laws of optical systems it is practical to place a picture in the projection equipment that is not flat standing.

Another disadvantage is that the projection of moving pictures comes up against difficulties in the known solutions, the solution of which further increases the costs.

Another disadvantage is that due to picture displaying via mirror systems and the positioning of the projection device, the projected pictures can only be enjoyed from a relatively short distance, so the advertising device is not able to carry out its basic task, according to which it has to send out the advertising message to as many people as possible.

Our aim with the invention was to overcome the disadvantage of known aerial advertising devices operating on the principle of displaying the projected picture on the inside of the balloon and to create a version that, beside simple structural construction and operability, is able to display still and moving pictures that change their positions over time that can be enjoyed from a large distance.

The recognition that led to the construction according to the invention was that if as an image formation unit we use projection devices that are different to those known and that are arranged in a unique way as compared to one another and the inflatable information-carrying body, which we link up in a novel way to an image-storage and editing part-unit that has not yet been used in this field, then a projected area can be produced on the surface of the balloon-like information-carrying body on which even moving pictures that revolve around 360° can be displayed, and in this way the task can be solved.

In accordance with the set aim the aerial advertising device for the presentation of pictures that change over time according to the invention—which contains an inflatable information-carrying body that has a hollow internal space, a supporting structure positioned in the internal space of the information-carrying body, an image formation unit connected to the supporting structure, as well as a power supply unit linked to the image formation unit and a fixing unit connected to the information-carrying body, the information-carrying body has a filling opening in connection with the internal space, furthermore, a group of markings consisting of one or more characters and/or graphics is displayed on the information-carrying body, and at least a part of the group of markings displayed on the information-carrying body is formed by the virtual picture projected onto the internal surface of the information-carrying body with the assistance of the image formation unit—is constructed in such a way that the image formation unit is formed by an ordered group of at least six projection devices permanently fixed in relation to the information-carrying body, the individual projection devices are connected to an image-storage and editing part-unit via a data transfer channel, the supporting structure has supporting plates that can be moved independently of each other, at least some of the individual projection devices are fitted to different supporting plates, and at least one continuous part of the group of markings is formed by the continuous group of picture elements projected by at least a group of some of the projection devices arranged in this way.

A further criterion of the aerial advertising device according to the invention may be that at least some of the projection devices are LCD projectors.

In a possible version of the aerial advertising device the image-storage and editing part-unit is a computing technology device, practically a fast and powerful personal computer, or the image-storage and editing part-unit is at least three video players and a synchronising part-unit harmonising the operation of these with each other.

In a further construction of the invention the image formation unit and/or the image-storage and editing part-unit are in connection with a remote control unit.

In another, different construction form of the aerial advertising unit there is a radio frequency signal transmission unit arranged between the image-storage and editing part-unit and the image formation unit, the radio frequency signal transmission unit has a first and a second transceiver, the first transceiver is connected to the image-storage and editing part-unit and the second transceiver to the projection devices of the image formation unit.

From the point of view of the invention it is favourable if the information-carrying body is an envelope put together from skin elements joined with a gas-tight seal, and at least some of the skin elements are connected to the supporting structure.

The most important advantage of the aerial advertising device according to the invention is that due to the use of the image formation unit of novel construction and positioning projected still and moving picture public interest information can be displayed that runs around the whole of the information-carrying body and that can be seen and enjoyed from a large distance, and so this information can be sent out to a large number of persons under favourable cost conditions.

Another advantage is that due to the new type of image formation unit and the image storage and editing part-unit the information to be displayed can be replaced, change—even, in a given case, from a large distance, which was not possible in the case of the traditional constructions.

Another advantage to be listed is that in the construction according to the invention the movement of the projected information on the skin elements does not require mechanically operated rotation or other moving devices, due to which the operation of the aerial advertising device becomes significantly more reliable, and the probability of a fault occurring becomes significantly less. Advantages deriving from this include simpler control, maintenance and the reduction of operation costs.

It is also to be seen as favourable that due to the lack of units carrying out mechanical movement the mass to be retained in the air is reduced, and so less upthrust needs to be produced, and this, reducing the charge to be placed in the internal space of the information-carrying body, also means a saving in operation costs.

Figure 3:
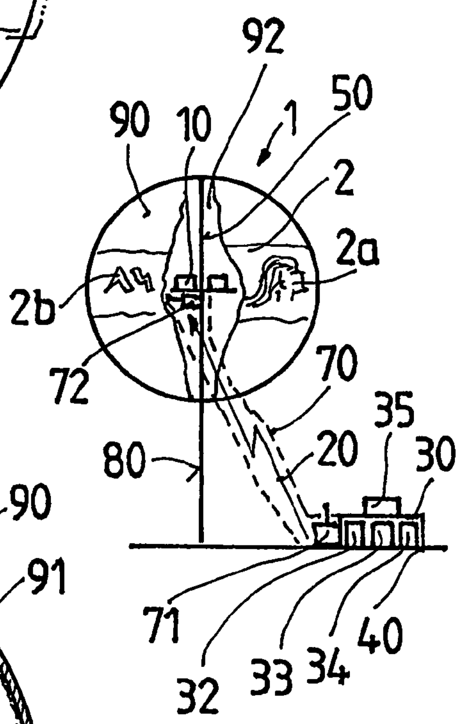

In the following the aerial advertising device according to the invention is presented in more detail in connection with construction examples on the basis of a drawing. On the drawing FIG. 1 shows a version of the aerial advertising device according to the invention in side view, in partial cross section, FIG. 2 shows the cross section taken along the plane marked in FIG. 1 as II-II, FIG. 3 shows the outline picture of another construction of the aerial advertising device in side view.

Figure 2:
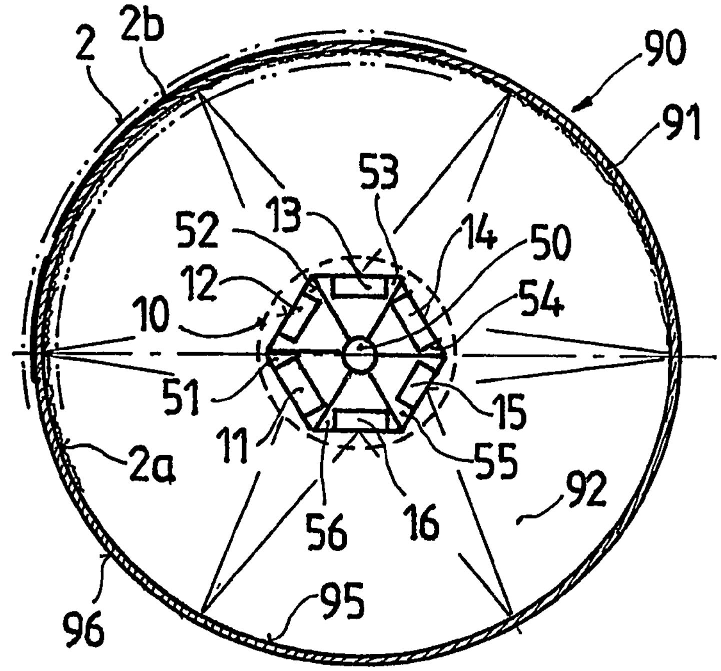

On FIGS. 1 and 2 a construction of the aerial advertising device 1 according to the invention can be seen in which the information-carrying body 90 is fixed in a stable manner to the plinth 40 with the help of the column-like fixing unit 80. The continuation of the fixing unit 80 is formed by the supporting structure 50, which starting from the filling opening 93, runs all the way through the internal space 92 of the information-carrying body 90 surrounded by the skin elements 91 and it is also fixed to the internal surface 95 of the upper part of the information-carrying body. This connection between the information-carrying body 90 and the fixing unit 80 forming a single unit with the supporting structure 50 makes it possible for the aerial advertising device 1 to withstand greater wind pressures without any problems or risks.

The information-carrying body 90 is made from skin elements 91 of appropriate material, practically PE or PP sheeting, fixed with welds ensuring a gas-tight seal. These skin elements 91 together enclose the internal space 92, in which supporting plate 51, supporting plate 52, supporting plate 53, supporting plate 54, supporting plate 55 and supporting plate 56 are positioned fixed to the supporting structure 50. The supporting plates 51, 52, 53, 54, 55, 56 are connected to the supporting structure 50 so that they may move as compared to each other and the supporting structure 50.

The supporting plates 51, 52, 53, 54, 55, 56 together carry the image formation unit 10, which includes in it projection device 11, projection device 12, projection device 13, projection device 14, projection device 15 and projection device 16. In this construction example projection devices 11, 12, 13, 14, 15 and 16 are identical types of LCD projector which have sufficient luminance for the task. Naturally, a version can be imagined in which the image formation unit 10 is formed by different projection devices 11, 12, 13, 14, 15 and 16.

FIG. 2 well illustrates that the projection devices 11, 12, 13, 14, 15 and 16 that form the image formation unit 10 are all individually positioned on different individual supporting plates 51, 52, 53, 54, 55, 56 that are fixed to the supporting structure. This is necessary because the projected picture elements 2*a* projected onto the internal surface 95 of the information-carrying body 90 by the individual projection devices 11, 12, 13, 14, 15 and 16 can be positioned in the simplest manner so that together they can create a ring-like band—in the present case—360° around the whole circumference of the information-carrying body 90.

We have to remark here that the image formation unit 10 has to consist of at least four projection devices 11, 12, 13, 14, and according to this four supporting plates 51, 52, 53 and 54 are required so that the projected picture element 2*a* can run around the whole circumference. However, it is more favourable if there are the six projection devices 11, 12, 13, 14, 15 and 16 and supporting plates 51, 52, 53, 54, 55, 56 presented in the example.

Beside the projected picture element 2*a* appearing on the internal surface 95 of the skin elements 91 surrounding the internal space 92 of the information-carrying body 90 in this version the group of markings 2 also includes the permanent picture element 2*b*, which is positioned on the outside surface 96 of the skin elements 91 of the information-carrying body 90.

Returning now to FIG. 1 it can be illustrated on it that the projected picture element 2*a* and the permanent picture element 2*b* together form a group of markings 2. It can also be imagined, however, that the permanent picture element 2*b* is fixed to the external surface 96 of the information-carrying body 90 using a technology, e.g. painted, so that it can be seen easily in the light of day, but at night, when the luminance of the projected picture element 2*a* is dominant it is unnoticeable, so the solution according to the invention can also be used so that it provides different sights during the day and at night.

The image storage and editing part-unit 30 supplies the image information to the projection devices 11, 12, 13, 14, 15 and 16 of the image formation unit 10, which here is a computer technology device 31. The signals from the computer technology device 31 are transferred to the image formation unit 10 via the data transfer channel 20, which in the present version is a low impedance cable. The computer technology device 31 and the projection devices 11, 12, 13, 14, 15 and 16 of the image formation unit 10 can be controlled by the remote control unit 60.

In the version according to FIG. 1 the internal space 92 of the information-carrying body 90 can be filled through the regulator valve 94 fitted into the filling opening 93 with non-explosive gas that is lighter than air, this is favourably helium.

During the use of the aerial advertising device 1 according to FIGS. 1 and 2 first the fixing unit 80 and together with this that supporting structure 50 are set up on the plinth 40. Following this the supporting plates 51, 52, 53, 54, 55, 56 are fitted to the supporting structure 50, then on each of the supporting plates 51, 52, 53, 54, 55, 56 we place one of the projection devices 11, 12, 13, 14, 15 and 16 that form the image formation unit 10. Following this the internal space 92 of the information-carrying body 90 is inflated, and when the skin elements 91 are tight, then with the help of the computer technology device 30 of the image storage and editing part-unit 30 the information to be displayed is sent to the projection devices 11, 12, 13, 14, 15 and 16 via the data transfer channel 20. Each of the projection devices 11, 12, 13, 14, 15 and 16 projects the projected picture element 2*a* sent to it onto the internal surface 95 of the information-carrying body 90, so it can be decided what position each of the projection devices 11, 12, 13, 14, 15 and 16 need to be set up in on the associated supporting plate 51, 52, 53, 54, 55, 56.

When the set up of the supporting plates 51, 52, 53, 54, 55, 56 carrying the projection devices 11, 12, 13, 14, 15 and 16 results in that a projected band runs completely around the external surface 96 of the information-carrying body 90, and the projected picture elements 2*a* created by the projection devices 11, 12, 13, 14, 15 and 16 of the image formation unit 10 match up with each other suitably then the positions of the supporting plates 51, 52, 53, 54, 55, 56 are fixed, a gas charge of an amount suitable to ensure the operating pressure is put into the internal space 92 of the information-carrying body 90 through the regulator valve 94 of the filling opening 93 and then the regulator valve 94 is closed. Following this either the remote control unit 60 or the computer technology device 31 of the image storage and editing part-unit 30 is used to set the focus or other setting of the projection devices 11, 12, 13, 14, 15 and 16 of the image formation unit 10 by sending a control signal—via the data transfer channel 20.

When the group of markings 2 is displayed data files containing picture information recorded earlier using procedures known in themselves is loaded into the computer technology device 31 either through an information technology network or using a data carrier and with the help of the remote control unit 60 the program performing the display is started. The computer technology device 31 sends, in synchronised form through the data transfer channel, the picture information to each individual projection device 11, 12, 13, 14, 15 and 16 of the image formation unit 10 that is to be projected by it, which then creates the projected picture element 2*a* on the internal surface 95 of the skin elements 91 of the information-carrying body 90.

This projected picture element 2*a* either on its own or in unison with the permanent picture elements 2*b* on the external surface 96 of the skin elements 91 of the information-carrying body 90 creates the group of markings 2 that is to be finally displayed. Using this solution not only moving pictures or still pictures that change one after the other can be displayed on the information-carrying body 90, but it is also possible for groups of markings 2 to be displayed that run around the circumference of the information-carrying body 90, in other words that change over time and space.

FIG. 3 shows an aerial advertising device 1 that is slightly different from the previous one. It can be observed that here also there is the information-carrying body 90 that the group of markings 2 made up of the projected picture element 2*a* and the permanent picture element 2*b* is displayed. Also to be found is the fixing unit 80 standing on the plinth 40 and which retains the information-carrying body 90 at a given distance from the plinth 40, as is the supporting structure 50 in the internal space 92 of the information-carrying body 90, and, furthermore, the image formation unit 10 positioned in the internal space 92 of the information-carrying body 90. In this construction form the fixing unit is formed by a strong wound wire cable, which counters the upthrust of the gas in the internal space 92 of the information-carrying body 90.

The basic difference is, however, that the image storage and editing part-unit 30 consists of three video players 32, 33 and 34 and a synchronising part-unit 35 that regulates the playing of video player 32, video player 33 and video player 34. The image storage and editing part-unit 30 here is supplemented with the first transceiver 71 belonging to the radio frequency signal transmission unit 70, while the second transceiver 72 of the radio frequency signal transmission unit 70 is fitted to the image formation unit 10. Here also between the first transceiver 71 and the second transceiver 72 there is a data transmission channel 20 set up, which, however, means a radio frequency connection.

The operation difference of this version consists of that the signals of the picture information to be displayed are sent with the help of the virtual data transmission channel 20 by wireless signal transmission from the video players 32, 33 and 34 of the image storage and editing part-unit 30 to the image formation unit 10.

The aerial advertising device according to the invention can be used to advantage especially in the evening and at night for displaying information and advertisements in an attention-grabbing manner.

List of references

| | |
|---|---|
| 1 aerial advertising device | |
| 2 group of markings | 2a projected picture element |
| | 2b permanent picture element |
| 10 image formation unit | 11 projection device |
| | 12 projection device |
| | 13 projection device |
| | 14 projection device |
| | 15 projection device |
| | 16 projection device |
| 20 data transfer channel | |
| 30 editing part-unit | 31 computer technology device |
| | 32 video player |
| | 33 video player |
| | 34 video player |
| | 35 synchronising part-unit |
| 40 plinth | |
| 50 supporting structure | 51 supporting plate |
| | 52 supporting plate |
| | 53 supporting plate |
| | 54 supporting plate |
| | 55 supporting plate |
| | 56 supporting plate |
| 60 remote control unit | |
| 70 radio frequency signal transmission unit | 71 first transceiver |
| | 72 second transceiver |
| 80 fixing unit | |
| 90 information-carrying body | 91 skin element |
| | 92 internal space |
| | 93 filling opening |
| | 94 regulator valve |
| | 95 internal surface |
| | 96 outside surface |

The invention claimed is:

1. An aerial advertising device for the presentation of pictures that change over time, said device comprising an inflatable information-carrying body that has a hollow internal space, a supporting structure positioned in the hollow internal space of the information-carrying body, an image formation unit connected to the supporting structure, a power supply unit linked to the image formation unit, and a fixing unit connected to the information-carrying body;

said information-carrying body comprising a filling opening connected to the hollow internal space, a group of marking comprising one of at least one character and a graphics displayed on the information-carrying body, wherein at least a part of the group of markings is displayed on the information-carrying body and is formed by a virtual picture projected onto an internal surface of the information-carrying body with the assistance of the image formation unit;

wherein the image formation unit is formed by an ordered group of at least six projection devices permanently fixed in relation to the information-carrying body, each of the projection devices being connected to an image-storage and editing part-unit via a data transfer channel, the supporting structure having supporting plates which can be moved independently, at least some of the individual projection devices being fitted to different supporting plates, and at least one continuous part of the group of markings being formed by a continuous group of picture elements projected by at least a group of some of the projection devices.

2. The aerial advertising device according to claim 1, wherein at least some of the projection devices comprise liquid crystal display projectors.

3. The aerial advertising device according to claim 2, wherein the image-storage and editing part-unit is a computing technology device comprising a fast and powerful personal computer.

4. The aerial advertising device according to claim 3, further comprising a radio frequency signal transmission unit disposed between the image-storage and editing part-unit and the image formation unit, the radio frequency signal transmission unit including a first transceiver and a second transceiver, the first transceiver being connected to the image-storage and editing part-unit and the second transceiver being connected to the projection devices of the image formation unit.

5. The aerial advertising device according to claim 3, wherein the information-carrying body comprises an envelope formed from skin elements joined with a gas-tight seal, at least some of the skin elements being connected to the supporting structure.

6. The aerial advertising device according to claim 2, wherein the image-storage and editing part-unit is formed by at least three video players and a synchronising part-unit for harmonizing operation of said at least three video players.

7. The aerial advertising device according to claim 6, wherein at least one of the image formation unit and the image-storage and editing part-unit is connected to a remote control unit.

8. The aerial advertising device according to claim 7, further comprising a radio frequency signal transmission unit disposed between the image-storage and editing part-unit and the image formation unit, the radio frequency signal transmission unit including a first transceiver and a second transceiver, the first transceiver being connected to the image-storage and editing part-unit and the second transceiver being connected to the projection devices of the image formation unit.

9. The aerial advertising device according to claim 8, wherein the information-carrying body comprises an envelope formed from skin elements joined with a gas-tight seal, at least some of the skin elements being connected to the supporting structure.

10. The aerial advertising device according to claim 7, wherein the information-carrying body comprises an envelope formed from skin elements joined with a gas-tight seal, at least some of the skin elements being connected to the supporting structure.

11. The aerial advertising device according to claim 6, further comprising a radio frequency signal transmission unit disposed between the image-storage and editing part-unit and the image formation unit, the radio frequency signal transmission unit including a first transceiver and a second transceiver, the first transceiver being connected to the image-storage and editing part-unit and the second transceiver being connected to the projection devices of the image formation unit.

12. The aerial advertising device according to claim 6, wherein the information-carrying body comprises an envelope formed from skin elements joined with a gas-tight seal, at least some of the skin elements being connected to the supporting structure.

13. The aerial advertising device according to claim 2, wherein at least one of the image formation unit and the image-storage and editing part-unit is connected to a remote control unit.

14. The aerial advertising device according to claim 2, further comprising a radio frequency signal transmission unit disposed between the image-storage and editing part-unit and the image formation unit, the radio frequency signal transmission unit including a first transceiver and a second transceiver, the first transceiver being connected to the image-storage and editing part-unit and the second transceiver being connected to the projection devices of the image formation unit.

15. The aerial advertising device according to claim 2, wherein the information-carrying body comprises an envelope formed from skin elements joined with a gas-right seal, at least same of the skin elements being connected to the supporting structure.

16. The aerial advertising device according to claim 1, wherein the image-storage and editing part-unit is a computing technology device comprising a fast and powerful personal computer.

17. The aerial advertising device according to claim 1, wherein the image-storage and editing part-unit is formed by at least three video players and a synchronising part-unit for harmonizing operation of said at least three video players.

18. The aerial advertising device according to claim 1, wherein at least one of the image formation unit and the image-storage and editing part-unit is connected to a remote control unit.

19. The aerial advertising device according to claim 1, further comprising a radio frequency signal transmission unit disposed between the image-storage and editing part-unit and the image formation unit, the radio frequency signal transmission unit including a first transceiver and a second transceiver, the first transceiver being connected to the image-storage and editing part-unit and the second transceiver being connected to the projection devices of the image formation unit.

20. The aerial advertising device according to claim 1, wherein the information-carrying body comprises an envelope formed from skin elements joined with a gas-tight seal, at least some of the skin elements being connected to the supporting structure.

* * * * *